O. & M. ROSENTHAL.
FODDER BAG FOR HORSES.
APPLICATION FILED MAR. 16, 1918.

1,277,486.

Patented Sept. 3, 1918.

Witnesses:
M. Elkinson
Louis Horowitz

Inventors
Osias Rosenthal
Morris Rosenthal

By Sigmund Honig
Attorney

UNITED STATES PATENT OFFICE.

OSIAS ROSENTHAL AND MORRIS ROSENTHAL, OF NEW YORK, N. Y.

FODDER-BAG FOR HORSES.

1,277,486.  Specification of Letters Patent.  Patented Sept. 3, 1918.

Application filed March 16, 1918. Serial No. 222,794.

*To all whom it may concern:*

Be it known that we, OSIAS ROSENTHAL, a citizen of the United States, and a resident of the borough of the Bronx, in the county of the Bronx and State of New York, and MORRIS ROSENTHAL, a citizen of the Republic of Russia, and a resident of the borough of the Bronx, in the county of the Bronx and State of New York have invented certain new and useful Improvements in Fodder-Bags for Horses, of which the following is a specification.

This invention relates to new and useful improvements in fodder bags for horses.

The primary object of the invention is to provide a bag for conveniently holding feed or fodder for horses whereby the entire contents of the bag are accessible to the horse in such a manner as to insure the consumption of the entire allotted amount of feed.

A further object of the invention is the provision of a feed bag adapted for receiving fodder for a horse and for attachment to the horse's head, the arrangement being such that the contents of the bag are gently forced toward the animal's mouth during the feeding operation while the structure is not uncomfortable to the animal.

A still further object of the invention is to provide a feed bag that can be manufactured at slight expense and positioned in a normally closed arrangement when not in use, the device being adapted for mounting upon the head of an animal and preventing the loss of fodder while feeding the animal although allowing for suitable ventilation.

With these general objects in view and others that will appear as the nature of the invention is better understood, the same consists in the novel construction, combination and arrangement of parts hereinafter fully described, illustrated in the accompanying drawing and pointed out in the appended claim.

In the drawing forming a part of this application and in which like numerals refer to corresponding parts throughout the several views:—

Figure 1:
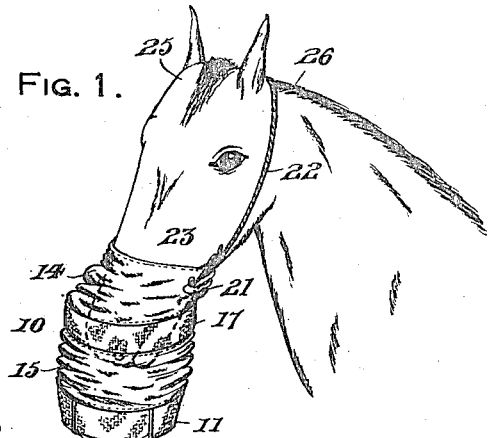
Figure 1 is a perspective view of the device in its operative arrangement upon a horse's head.
Figure 2:
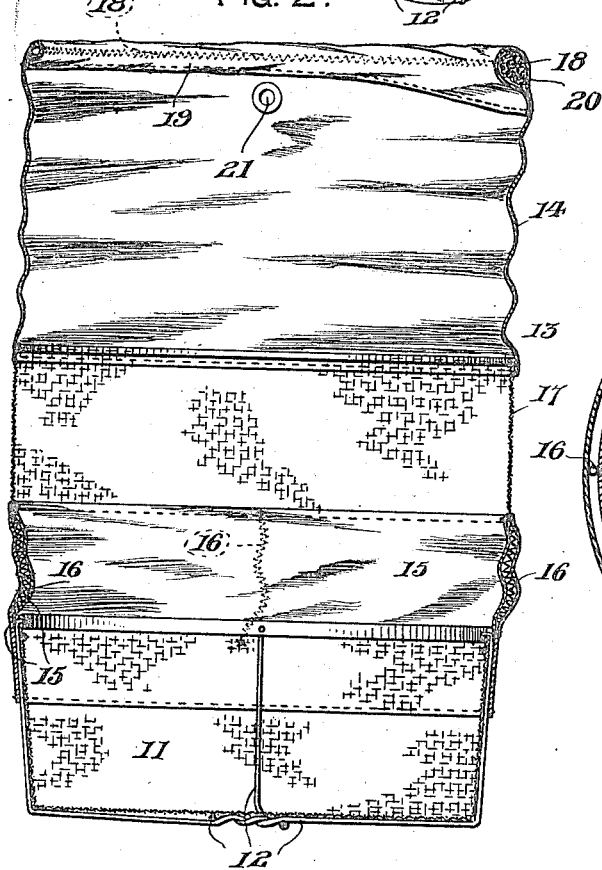
Fig. 2 is a central longitudinal sectional view of the device.
Figure 3:
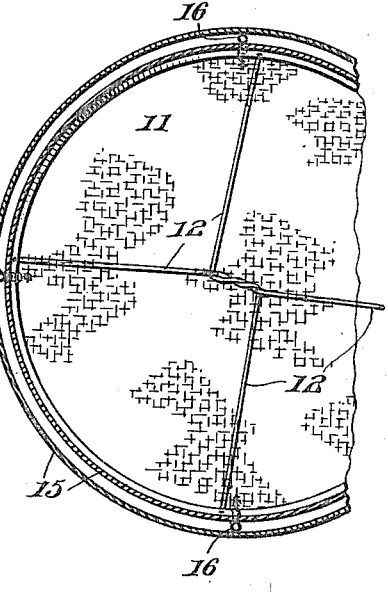
Fig. 3 is a transverse sectional view of the same.

Referring more in detail to the drawing, the invention broadly consists of a bag 10 having a foraminous cup 11 forming the bottom thereof and arranged with transversely positioned supporting wires 12 upon the outside of the cup serving to elevate the bottom of the bag above any support upon which the same may be mounted for permitting suitable ventilation through the bottom 11. The cylindrical side wall 13 of the bag is partially formed of canvas such as the upper section 14 thereof and an intermediate section 15, which latter section is formed of double thickness having transversely arranged helical springs 16 arranged across the same.

The section 15 as well as the springs 16 are secured to the top of the bottom cup 11 while a foraminous section 17 connects the section 14 with the section 15. A resilient member or spring 18 is arranged in a top fold or bead 19 of the bag at the free end of the section 14 and whereby the mouth of the bag is resiliently held upon the nose of the horse when the device is operatively arranged. A pad 20 is provided within one side of the bead 19 for engaging beneath the throat of the animal and whereby the device will be comfortable during its employment as well as preventing the spilling of the grain from the bag during feeding.

Suitable eyelets 21 are provided in the portion 14 while a rope 22 carried by the said eyelets may be positioned over the head and upon the neck of the horse. The device is illustrated in position in Fig. 1 of the drawing, it being understood that in operation the grain is positioned within the bag in the cup 11 while the springs 16 normally hold the cup substantially into contact with the foraminous section 17 so that the horse's mouth will be lightly contacted by the grain within the bag and this will continue until all of the grain has been consumed. The bead 19 closely engages the nose 23 of the horse 24 by reason of the spring 18 while the pad 20 prevents the escape of grain and the cord 22 extends over the horse's head 25 and is positioned upon the neck 26.

The entire device is readily collapsed when not in use for taking up little space and is convenient and comfortable during its operation as well as being sanitary and preventing any waste of the feed or fodder.

What we claim as new is:—

A feed bag comprising a foraminous bottom cup, a flexible tubular double wall section connected to the upper edge of the cup, springs for collapsing said section arranged between the walls thereof, a cylindrical foraminous section secured to the upper edge of said double wall section and a flexible mouth section carried by the upper edge of said foraminous section.

Signed at the city of New York, in the county of New York and State of New York this 26th day of February, 1918.

OSIAS ROSENTHAL.
MORRIS ROSENTHAL.

Witnesses:
MARY ELKINSON,
BENJAMIN COHEN.

Copies of this patent may be obtained for five cents each, by addressing the "Commissioner of Patents, Washington, D. C."